Sept. 9, 1952  G. S. KNOX  2,609,836
CONTROL HEAD AND BLOWOUT PREVENTER
Filed Aug. 16, 1946  13 Sheets-Sheet 1
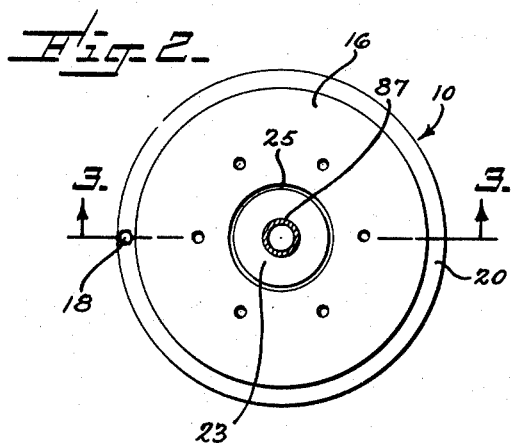
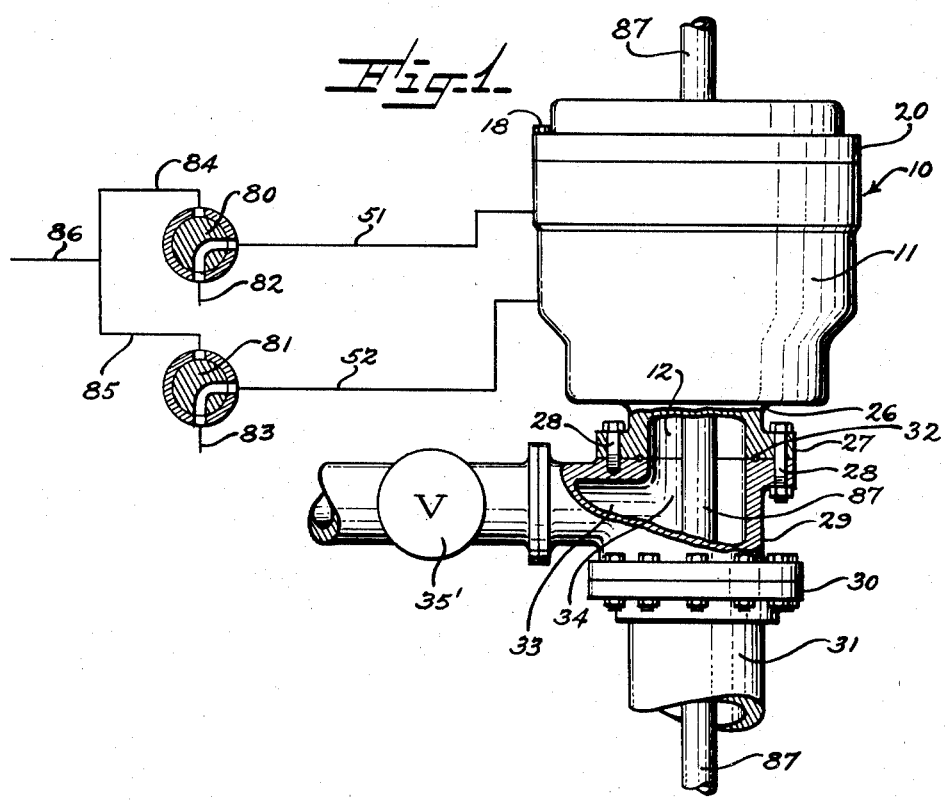
Inventor
Granville S. Knox
Barkulew & Scantlebury
Attys.

Sept. 9, 1952   G. S. KNOX   2,609,836
CONTROL HEAD AND BLOWOUT PREVENTER
Filed Aug. 16, 1946   13 Sheets-Sheet 2
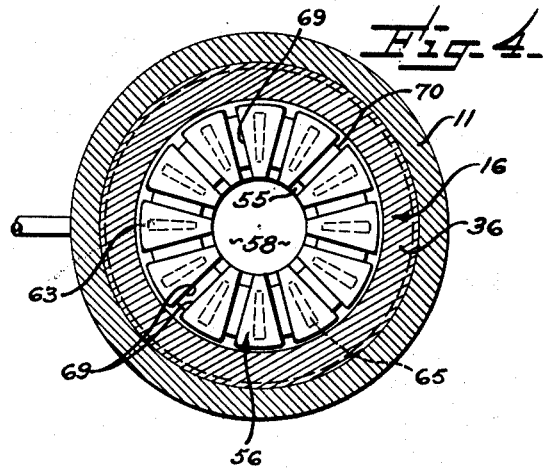
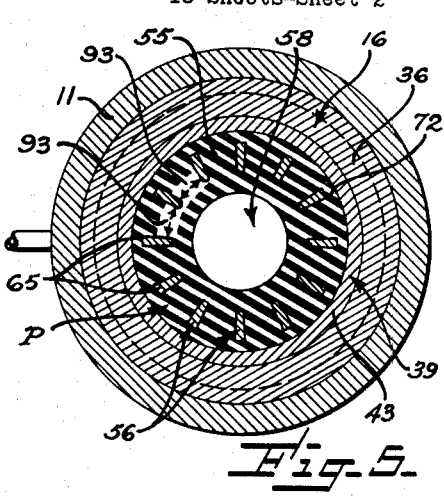
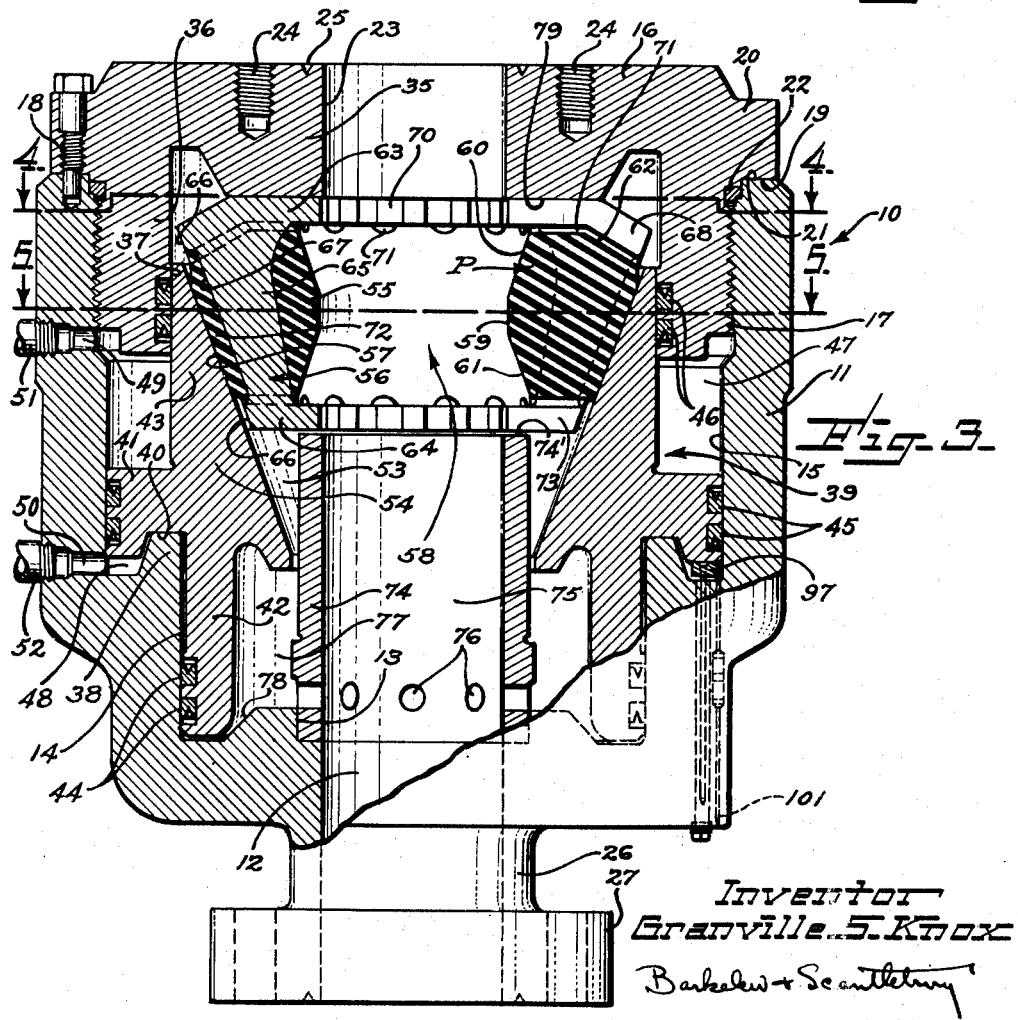
Inventor
Granville S. Knox
Barkelew + Scantlebury
Attys

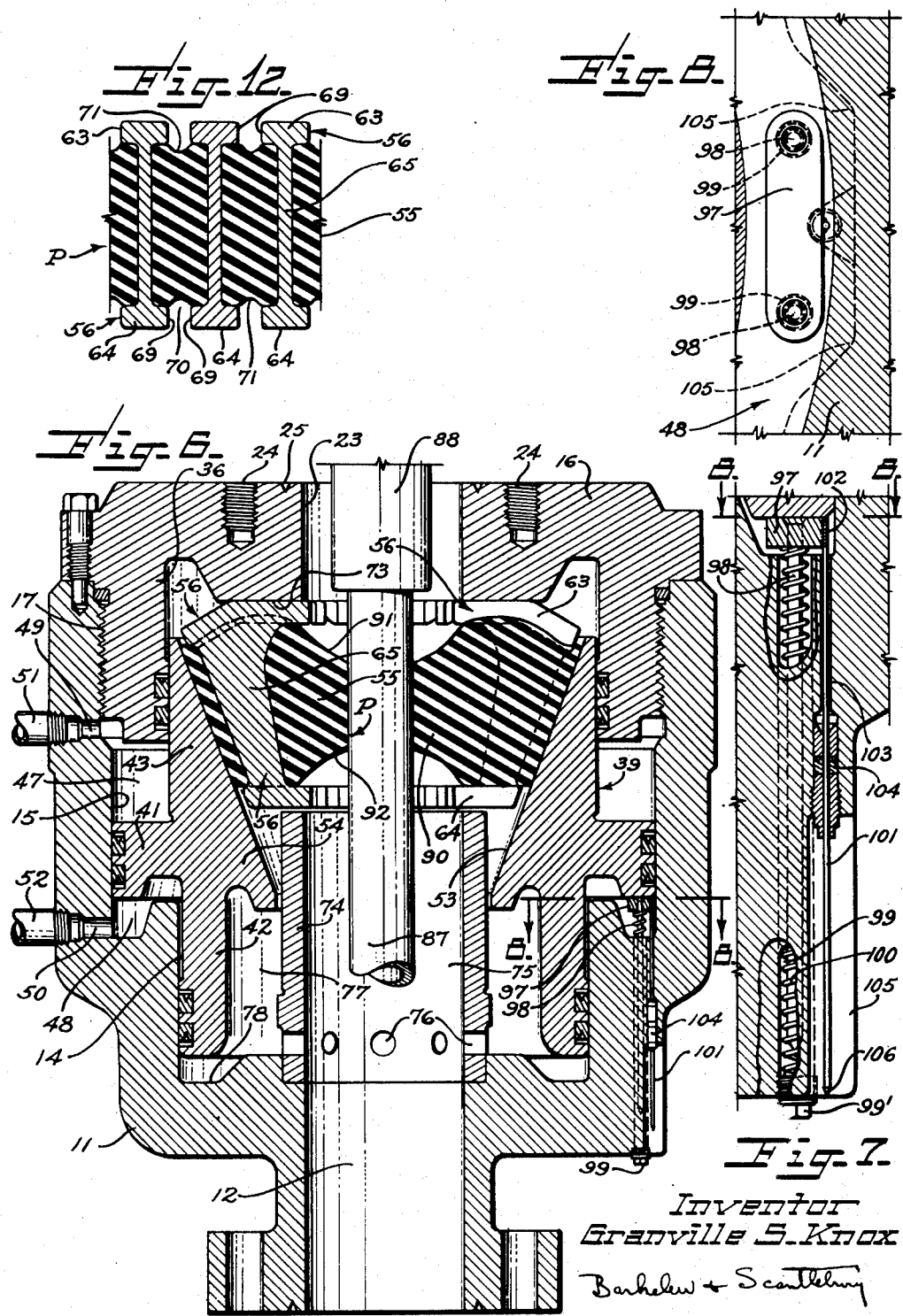

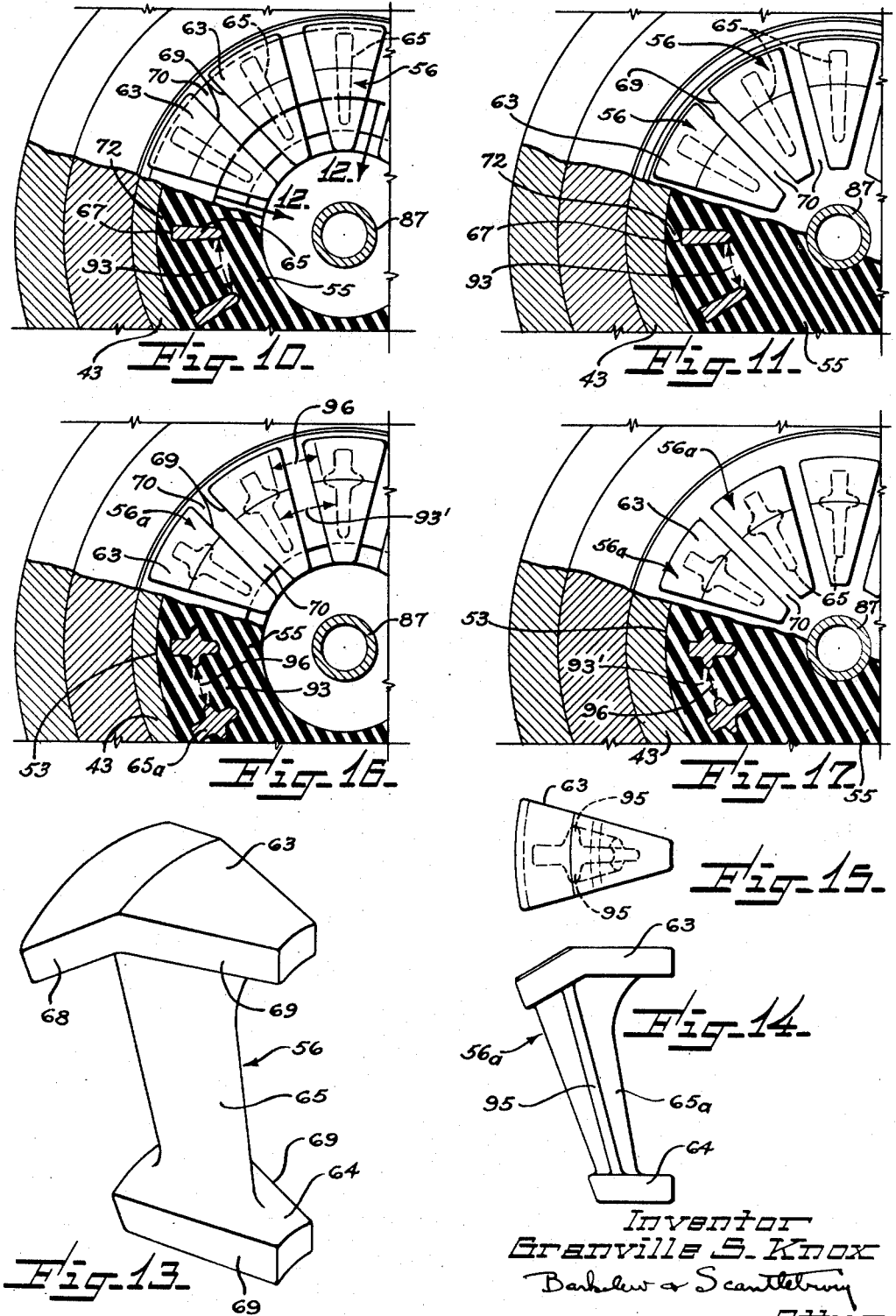

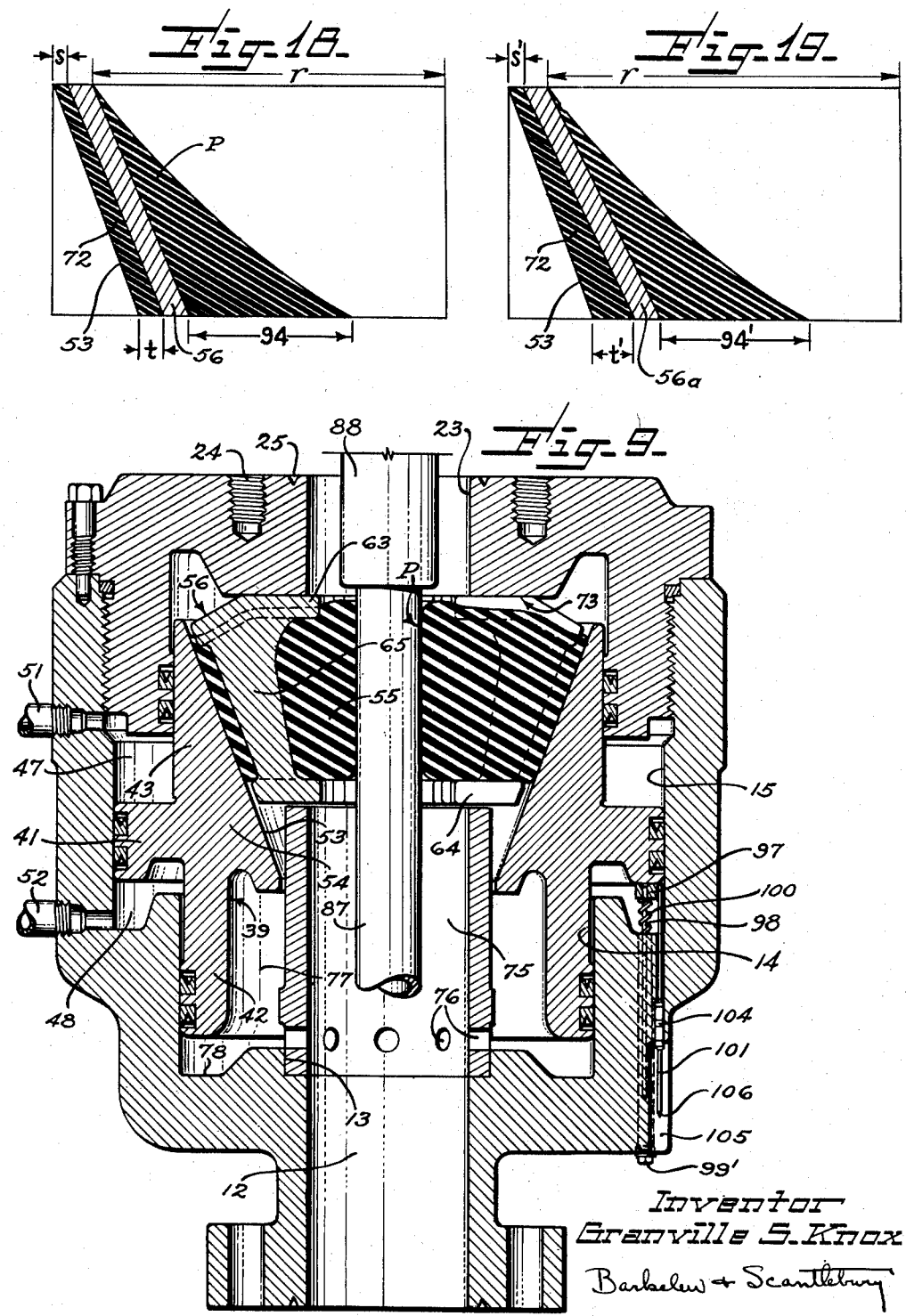

Sept. 9, 1952 G. S. KNOX 2,609,836
CONTROL HEAD AND BLOWOUT PREVENTER
Filed Aug. 16, 1946 13 Sheets-Sheet 6
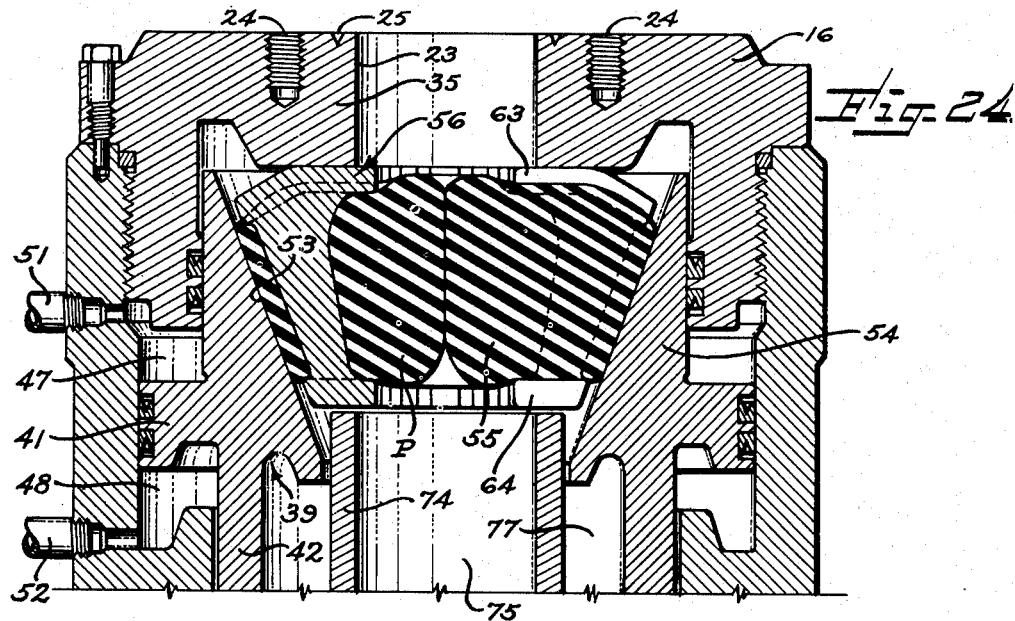
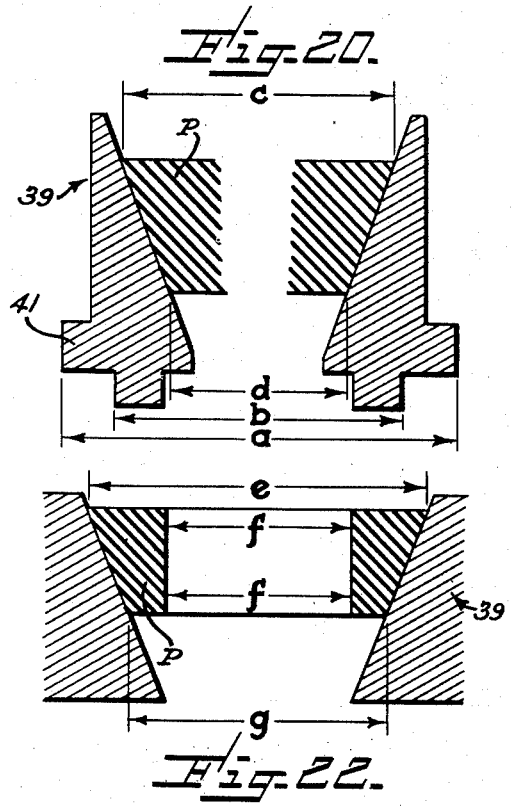
Inventor
Granville S. Knox

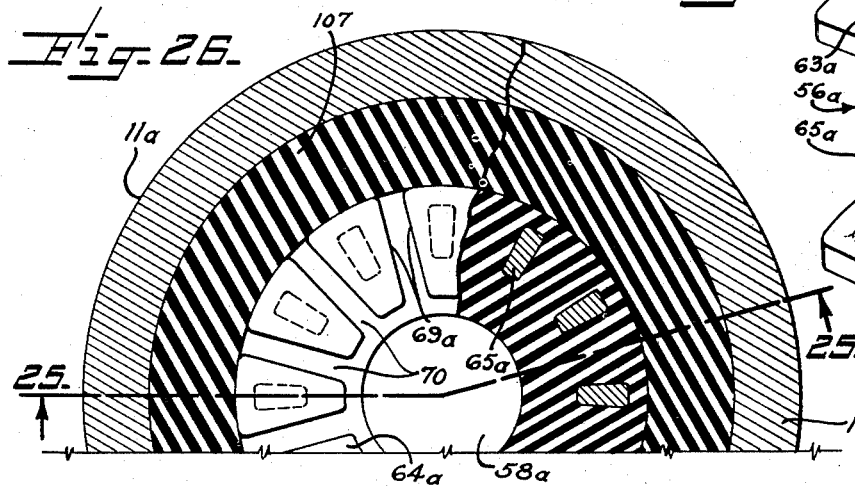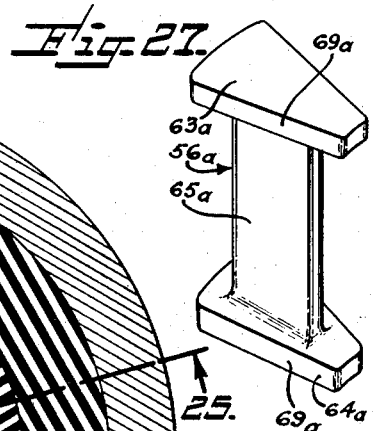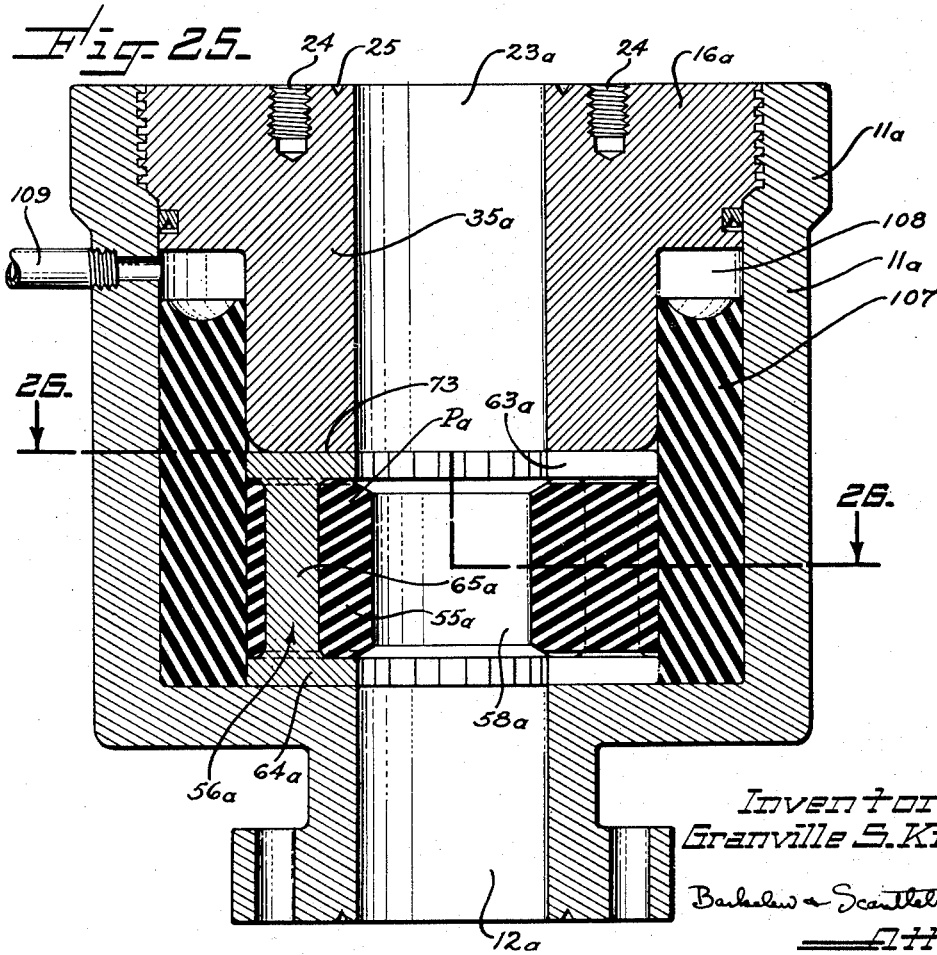

Sept. 9, 1952                G. S. KNOX                2,609,836
                    CONTROL HEAD AND BLOWOUT PREVENTER
Filed Aug. 16, 1946                              13 Sheets-Sheet 8
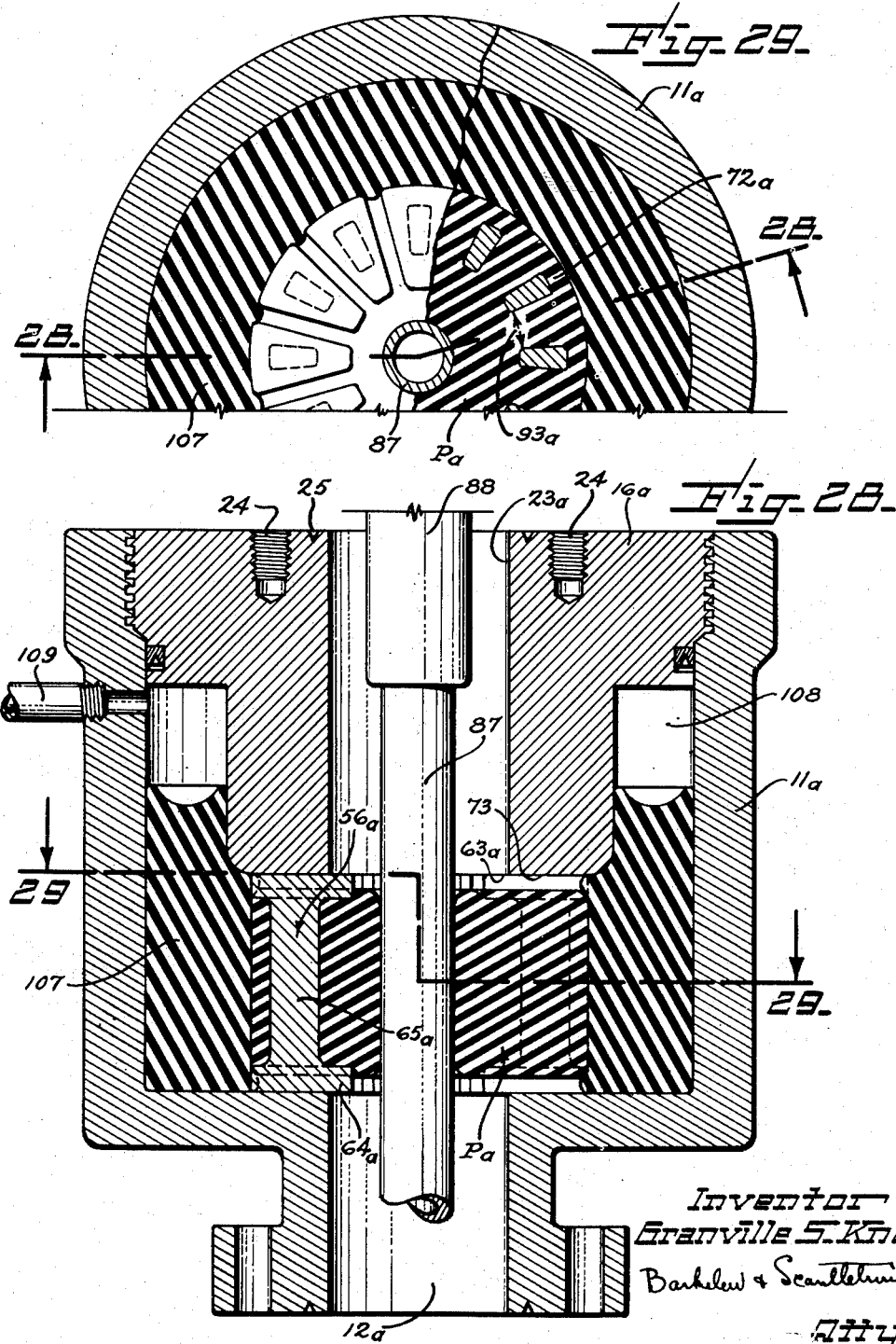

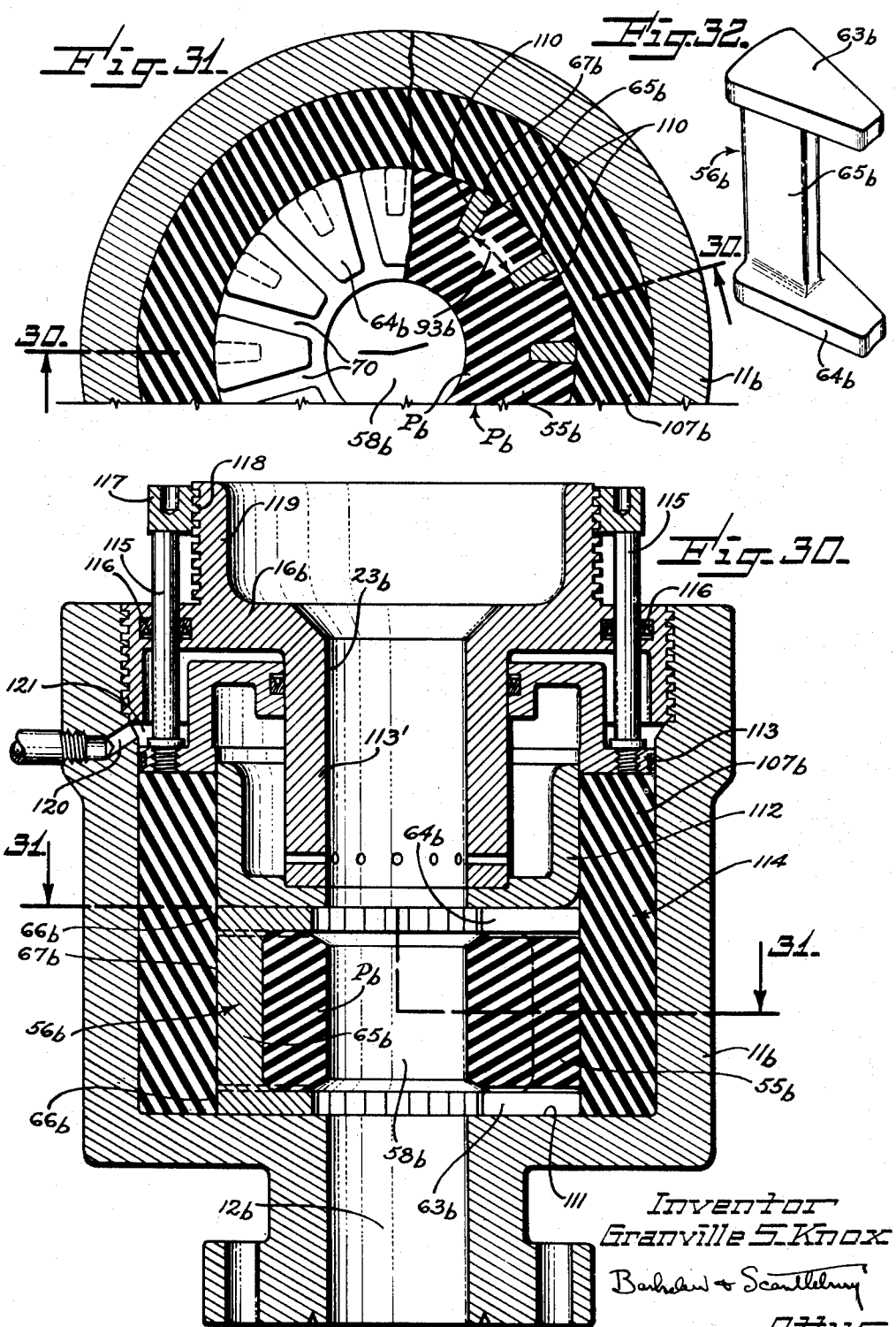

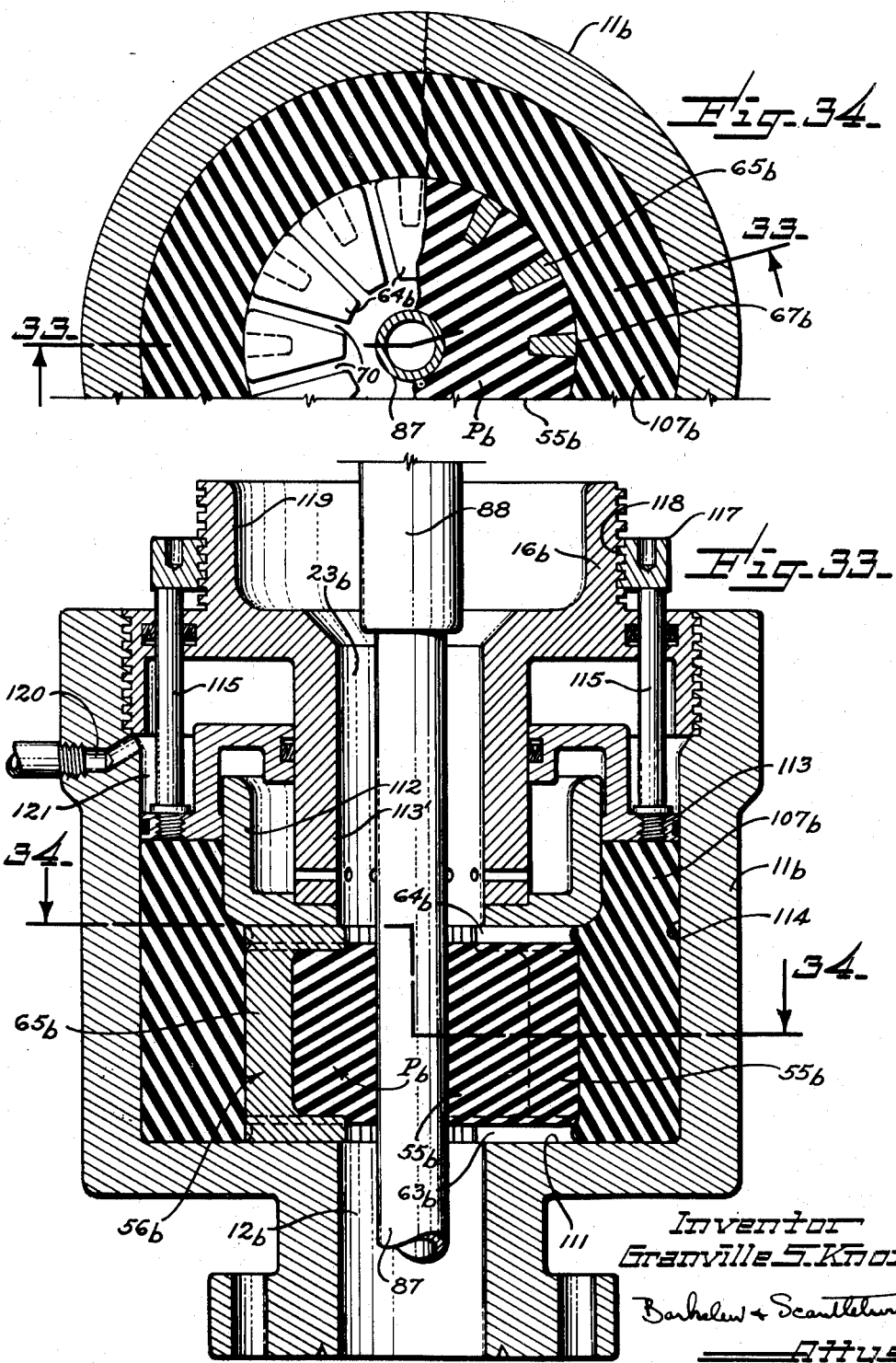

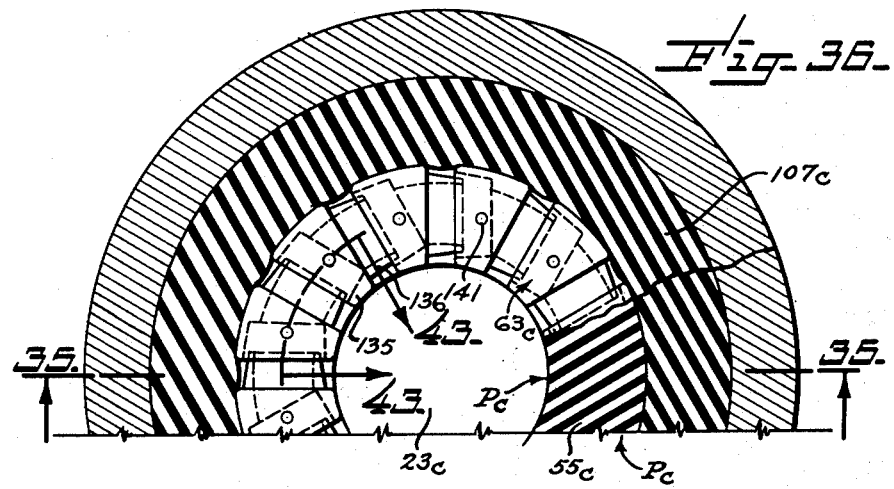
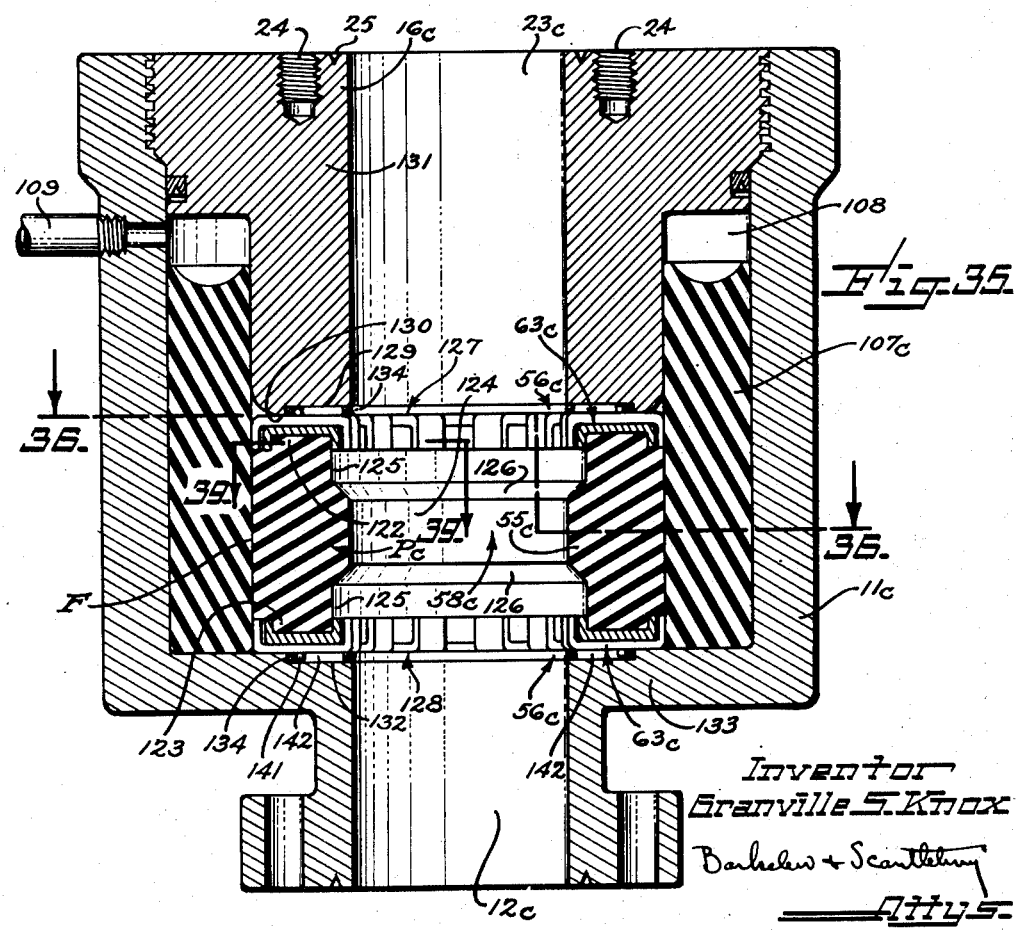

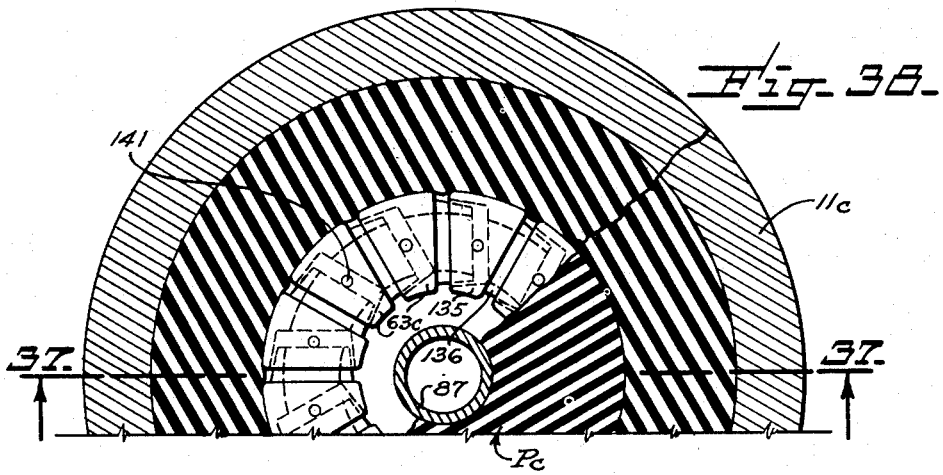
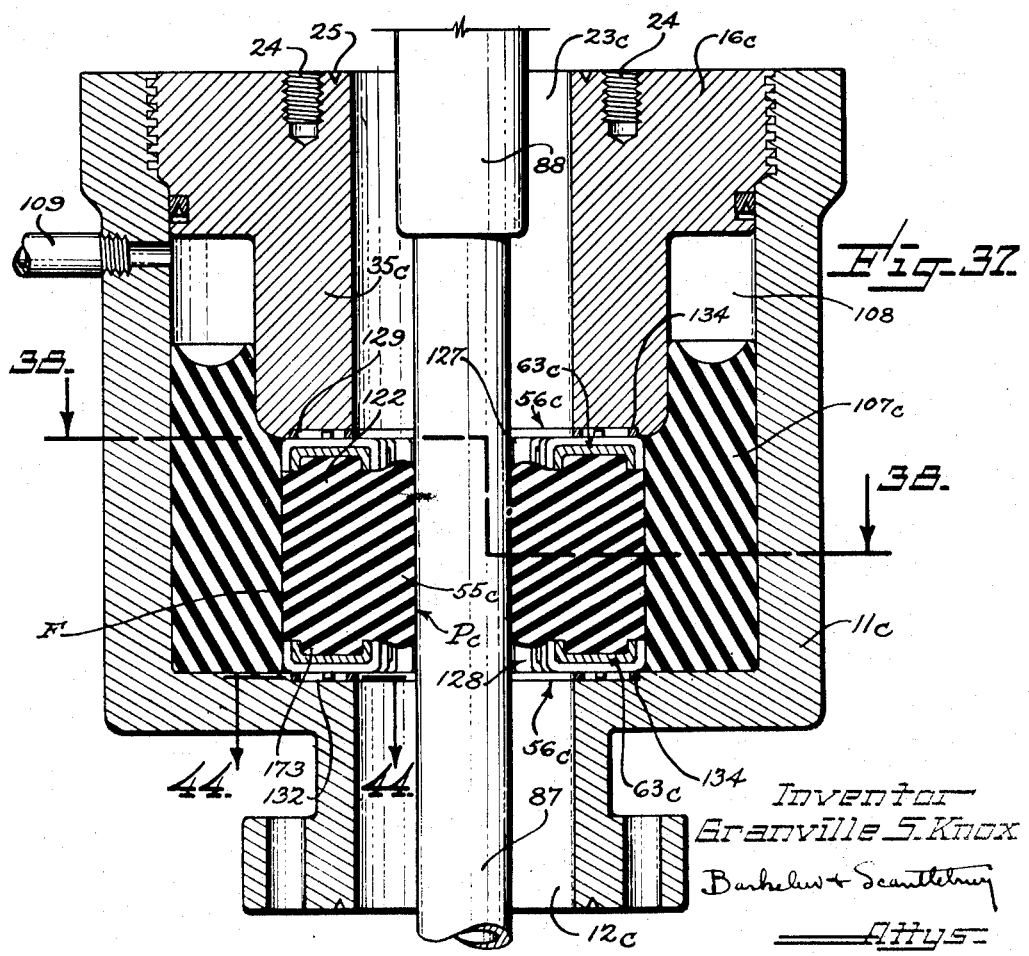

Sept. 9, 1952  G. S. KNOX  2,609,836
CONTROL HEAD AND BLOWOUT PREVENTER
Filed Aug. 16, 1946  13 Sheets-Sheet 13
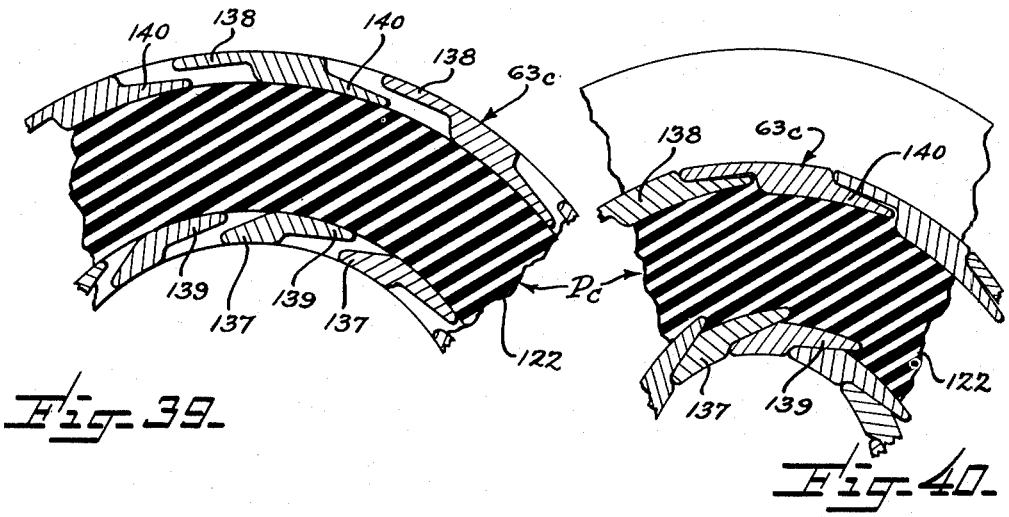
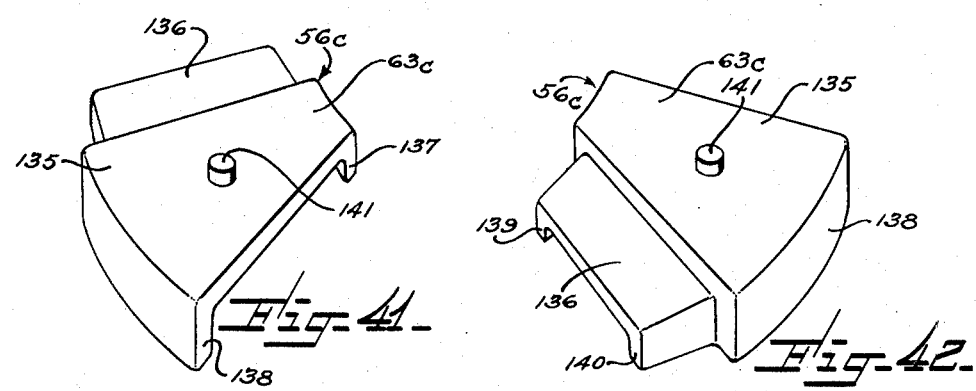
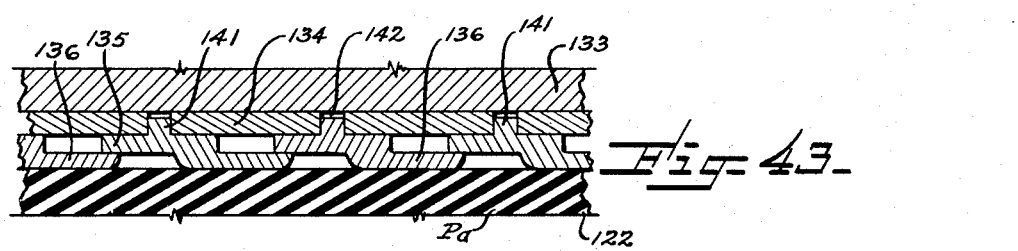
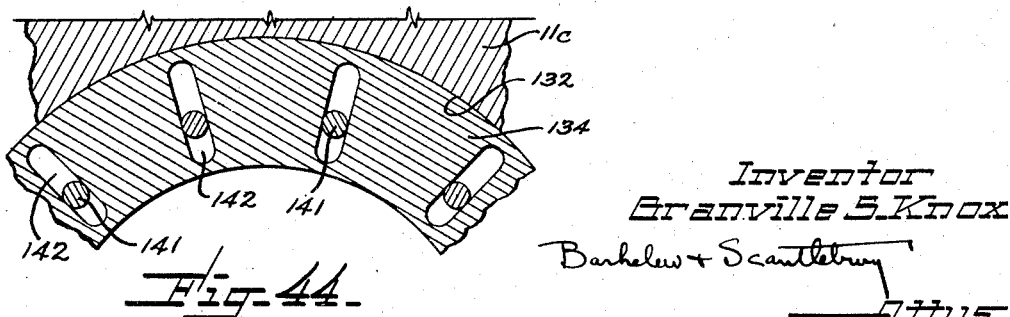
Inventor
Granville S. Knox
Barkelew + Scantlebury
Attys.

Patented Sept. 9, 1952

2,609,836

UNITED STATES PATENT OFFICE 2,609,836

CONTROL HEAD AND BLOW-OUT PREVENTER

Granville S. Knox, Los Angeles, Calif., assignor to Hydril Corporation, Los Angeles, Calif., a corporation of California Application August 16, 1946, Serial No. 691,110

22 Claims. (Cl. 137—618)

This invention has to do generally with control heads and blow-out preventers which are particularly useful for carrying out drilling operations where gas under pressure is present, or is liable suddenly to develop, in the well being drilled. I will therefore describe the invention in that environment, but this description is not to be considered as limitative on the broader aspects of the invention for, as a control head, it may be used in any situation where pressures are to be controlled.

Also, while the major use of the device is for sealing around drill pipes or other work extending from the well into the head, it is adapted for use in situations where no "work pipe" extends through the packer bore, the packer then being capable of radial compression to such an extent that its bore is entirely closed. In this case the packer is adapted to function as a variable-aperture flow valve or as a rubber-to-rubber shut-off valve for controlling the flow of fluids whether under high or low pressure.

The device may be used for maintaining constantly a seal about drill pipe as it is being rotated or moved vertically through the head during "pressure drilling," or it may be utilized as a blow-out preventer, in which latter case it is normally in "stand-by" condition but is effective to be brought instantly into play either automatically by reason of the development of well pressure, or by manually controlled actuating forces, to effect a seal about the work and thus prevent the well from blowing out. Once set by the application of external forces, the "hole-pressure" or pressure of the gas within the well, is effective to maintain the packer in sealing condition and, in some situations, to apply sealing force even greater than that applied by the setting pressure. It thereafter lies within the control of the operator to modify the effect of the "hole pressure" so the tightness of the seal may be varied to give the exact degree desirable for performing given subsequent drilling operations.

It is among the objects of the invention to provide a packing head which, in spite of the fact that it has sufficient diametrical capacity to take and seal off work of relatively great diameter, is effective also to seal off work of relatively small diameter. It follows that a single head has great range and is, within reasonable limits, adapted to accommodate all the elements of a given string of drilling tools from the relatively small diameter of the drill pipe, proper, through the various collars and upsets and through the relatively large drill collar and, in certain cases, even the tool at the lower end of the string. In fact, its accommodative capacity is so great that a single head is capable of functioning throughout a large range of drill-string sizes. The advantage of such capacity is obvious.

In spite of its range, the control head is relatively small as to overall diameter and height, this size characteristic being important from the standpoint of installation and operation, as is well understood by those skilled in the art.

The head is also of such character that it gives the operator ready and quick access to the various internal parts for inspection, repair, or replacement, it being possible to remove relatively rapidly wearing parts such as a packer, proper, without disassembling the rest of the head and by working entirely through the bore of the rotary table which usually overlies the head. On the other hand, the internal mechanism is reduced to such simplicity that there is no likelihood of its getting out of order.

It is also an important object of the invention to provide a device wherein the operation is safe, sure and rapid, for it will be recognized that very severe and sudden service strains are imposed on, and very severe duties are intended to be performed by, a device of this type. The device is necessarily a heavy piece of equipment and yet, in spite of that fact and in spite of the fact that it is adapted to control extremely high pressures, it is capable of being put into full operation instantly, and it is relatively delicately adjustable. It is possible to adjust the head so, even under tremendously high pressures, the work may be packed off either so there is no leakage at all or so there is just a predetermined "trickle" of leakage, such as may be desirable for lubrication purposes if the work is to be rotated or moved vertically. The packer may be selectively applied so it has such radial tightness about the work as to resist all movement of the work therethrough, or so it is at such a degree of radial compression that no leakage is allowed and yet the drill pipe collars may be "stripped" therethrough without damage to the packer.

It is also an object of the invention to provide a device wherein the packer element is capable of undergoing repeated sealing and stripping operations without harmful effect or destruction. Even where relatively large portions of the rubber may be torn or worn away, the packer is still capable of performing its functions, due to the large amount of displaceable rubber which is, in effect, held in reserve, the actuating piston or other actuating means then merely being operated in a manner to compensate for the wear-losses.

The packer element is novel, per se, and contributes considerably to the beneficial results enumerated above, there being provided rigid rubber-flow control elements having portions which may be, in effect, embedded in the rubber. However, the features and performance of these control elements and the packer, as a whole, as well as further objects and features of other aspects of the invention, may be discussed to better advantage in connection with the following detailed description, reference being had to the accompanying drawings, in which:

Fig. 1 is an elevation, partly in a broken away section, of a control head embodying my invention, also showing one means of attachment of the device to a well casing;

Fig. 2 is a top elevation of Fig. 1;

Fig. 3 is an enlarged section, partly in elevation, on line 3—3 of Fig. 2, the drill pipe, casing, and spool being omitted;

Fig. 4 is a reduced-scale section on line 4—4 of Fig. 3;

Fig. 5 is a reduced-scale section on line 5—5 of Fig. 3;

Fig. 6 is a view similar to Fig. 3, but showing all parts in section and showing the piston as having been raised sufficiently to engage the packer with a drill stem;

Fig. 7 is an enlarged detail showing the piston-position indicating means;

Fig. 8 is a section on line 8—8 of Fig. 7;

Fig. 9 is a view similar to Fig. 6 but showing the piston raised to a further extent, with a corresponding increase in packer-deformation, or extrusion;

Fig. 10 is an enlarged fragmentary view in which the sectional portions are taken on the plane 5—5 of Fig. 3 and the plan facial portion is taken on the plane of line 4—4 of Fig. 3;

Fig. 11 is a view similar to Fig. 10 but showing the position of the parts when the device is in the condition of Fig. 9;

Fig. 12 is a fragmentary, developed section on line 12—12 of Fig. 10;

Fig. 13 is a detached perspective view of one of the rigid members comprising a control element of one form of my improved packer;

Fig. 14 is a side elevation of a variational form of control member;

Fig. 15 is a top plan view of Fig. 14;

Figs. 16 and 17 are views corresponding to Figs. 10 and 11, respectively, but illustrating the substitution of the form of control member shown in Fig. 14 for the control member shown in Fig. 13, the control members having advanced further toward the center of the packer in Fig. 17 than in Fig. 11;

Fig. 18 is a diagram illustrating the relative position of a control member, in the form of Fig. 13, with respect to the resilient portion of the packer, taken at a given horizontal plane, at different stages in the travel of the piston;

Fig. 19 is a view similar to Fig. 18 but illustrating the characteristics when an individual control member is in the form of Fig. 14;

Figs. 20 and 21 are diagrams illustrating the change in ratio-advantage between the setting area and the reactive pressure area at different stages of piston movement;

Figs. 22 and 23 are diagrams illustrating the characteristic of bore-change, were the packer bore to be cylindrical from end to end when the packer is in radially expanded condition;

Fig. 24 is a view similar to the upper portion of Fig. 9 but showing the use of the device to control fluid flow, including a complete shut-off of such fluid under pressure conditions, when no pipe is extended through the packer bore;

Fig. 25 is a vertical, medial sectional view through a modified type of control head, as taken on the line 25—25 of Fig. 26;

Fig. 26 is a fragmentary section on line 26—26 of Fig. 25;

Fig. 27 is a detached perspective view of one of the control elements of the packer shown in Figs. 25 and 26;

Fig. 28 is a view similar to Fig. 25 but showing the position of the parts when the packer is closed about a drill stem;

Fig. 29 is a fragmentary section on line 29—29 of Fig. 28;

Fig. 30 is a vertical medial section through another embodiment of the invention, being taken on the line 30—30 of Fig. 31;

Fig. 31 is a fragmentary section on line 31—31 of Fig. 30;

Fig. 32 is a perspective view of one of the control elements of the packer shown in Figs. 30 and 31;

Fig. 33 is similar to Fig. 30 but showing the parts in the positions they occupy when the packer is applied to a drill stem;

Fig. 34 is a fragmentary section on line 34—34 of Fig. 33;

Fig. 35 is a medial section through another variational embodiment of the invention, being taken on the line 35—35 of Fig. 36;

Fig. 36 is a fragmentary section on line 36—36 of Fig. 35;

Fig. 37 is a view similar to Fig. 35 but showing the parts in the positions they occupy when the packer is applied to a drill stem;

Fig. 38 is a fragmentary section on line 38—38 of Fig. 37;

Fig. 39 is a fragmentary section on line 39—39 of Fig. 35;

Fig. 40 is a view similar to Fig. 39 but showing the position the parts assume when the device of Fig. 35 is in the condition of Fig. 37;

Figs. 41 and 42 are perspective views of adjacent segments making up the rigid control elements of the packer shown in Figs. 35 and 37;

Fig. 43 is a fragmentary, enlarged, and developed section on line 43—43 of Fig. 36; and Fig. 44 is an enlarged fragmentary section on line 44—44 of Fig. 37.

The control head, generally indicated at 10, includes a body member 11, having concentric bores 12, 13, 14, and 15 which are of progressively increased diameters. Cap 16 is releasably held to the body member by screw thread connection 17, being releasably locked by pilot bolt 18 in such a position that the face 19 of cap flange 20 engages the upper end 21 of body member 11, the cap and body member being packed off at 22. Cap 16 has a bore 23 which is of the same diameter and is concentric with body bore 12. Sunk in the upper face of cap 16 are bolt holes 24 for the attachment of equipment (not shown) thereabove. The annular groove 25, in that upper face, is adapted to receive a sealing ring (not shown) for sealing engagement with said equipment.

The neck 26 of body member 11 has an attachment flange 27 whereby connection is made through bolts 28 to the side outlet spool 29 or any other suitable fitting. The spool, in turn, is secured to coupling 30, the latter being adapted for direct or indirect connection to casing 31, a ring packing 32 being provided between flange 27 and fitting 29. The side outlet port 33 opens outwardly from the spool bore 34 to flow control valve 35' which may, for the purposes of this description, be considered as closed, throughout all operations.

Cap 16 has an internal annular flange 35 which defines the downward continuation of bore 23, and a peripheral flange 36 which defines bore 37, said bore 37 being concentric with all the body-member bores identified above.

At the junction of bores 14 and 15 is an annular, upstanding flange 38 which engages the packing actuating member 39 at 40 to limit the extent of downward movement of said member. The actuator 39 has a piston portion 41, having piston-fit in bore 15, and piston portion 42 which has piston-fit in bore 14. The actuator is extended upwardly at 43, extension 43 having piston fit in the cap-flange bore 37. Sealing rings 44, 45 and 46 are provided between piston portions 42, 41 and 43, respectively, and the respective cylinder defining walls which receive those portions.

Piston 41 divides body bore 15 into upper and lower cylinders or pressure chambers 47 and 48, ports 49 and 50 opening, respectively, from those chambers. External pipes 51 and 52 open to ports 49 and 50, respectively.

The actuator 39 has a downwardly and inwardly tapering conical bore 53, and the actuator portion 54 which defines this bore may be considered broadly as an internal, conical wedge, or as a packer-constricting element.

Packer P includes a massive annulus or sleeve 55 of plastic and, preferably, resilient material such as rubber or Neoprene. Where the device is to be used to make only one shut-off per packer (and therefore the packer does not need to reopen in readiness for subsequent closing operations) the packer need not be of resilient material. However, in most instances, it is intended that a single packer be adapted for repeated opening and closing operations, and therefore it is preferable that it have relatively high resilient characteristics, so it may be self-restoring to open position when the constricting force is removed. From this point on in the description, it will be assumed that the packer has such resilient characteristics, but this assumption is not to be considered as limitative on my broader claims. It has been found that rubber having a durometer hardness of about 75 is suitable for general use in my packer but, again, this specification of relative hardness is not to be considered as limitative on the invention.

The packer is shown as an unsplit, continuous annulus, but it will be understood that the invention is not limited to a packer wherein there is no split, so long as there is no angularly extending gap interrupting the continuity.

Included in the makeup of the packer is a series of rigid, rubber-flow-control elements 56. As will later appear, these elements may take different forms and still lie within the scope of my broader claims, but I will first describe the preferred form of elements which has individual features of advantage. These rigid control elements are individually movable bodily with the rubber in its movement of radial contraction and expansion and also, to a limited extent, movable individually with respect to the rubber, as will later appear. Taken together, the rigid control elements may be considered as a radially expansible and contractible armature embedded within annulus 55.

Molded annulus 55 has an outer conical face 57 which is complementary to actuator bore 53, and a bore 58 which has a central, substantially cylindrical portion 59 and oppositely inclining upper and lower portions 60 and 61, respectively; the outward flare, in each case being toward the associated end of the annulus. The outer portion of the annulus, at its upper end, is preferably beveled off, as at 62. The significance of these shape-characteristics will be made apparent later.

Referring particularly to Figs. 3, 10, 11, 12, and 13, it will be seen that each element 56 comprises top and bottom plates 63 and 64, respectively, rigidly connected by vertical rib 65, the outer faces 66 of the plates and the outer face 67 of the rib having substantially the same degree of taper as bore 53 and annulus face 57. Or plates 63, 64 may be considered as transverse flanges on rib 65. The "heel" 68 of the upper plate preferably inclines downwardly and outwardly in accordance with bevel 62. The rib is inset from all bounding edges (viewing the element 56 in plan) of both plates. Elements 56, which may of steel, bronze, or any other suitable rigid material, are preferably positioned in the rubber at the time of molding and, preferably, the rubber and the elements are bonded together by the use of suitable adhesive during the molding process. The plates of the control elements are sectorial in shape, as viewed in plan, and are arranged in a circular series, with spaces left between the opposing side edges 69 of the plates, both top and bottom. The plates are so shaped that the two opposed side edges 69 of adjacent elements are parallel, it following that as the elements move radially inward, the spaces 70 between them, from end to end, diminish equally in width, so there is no premature interference of the plates at their inner ends and so the rubber which may flow between the plates during the constriction of the annulus will not be pinched off at the radially inward ends of the plates. To reduce the amount of rubber tending to flow vertically between the plates when the packer is being constricted, the annulus is preferably recessed at 71 in line with spaces 70 (see Figs. 3 and 12).

The annulus 55 is molded so its outer annular portion 72 projects radially outward beyond the outer faces 66 of the plates, it following that these metallic faces do not engage the wall of actuator bore 53. For purposes of later description, I will consider annular portion 72 as being that portion which extends radially from face 57 to the outer faces 67 of ribs 65.

The packer is lowered, while cap 16 is detached, into the position of Fig. 3, the annulus 55 nicely fitting the upper portion of bore 53 without requiring appreciable radial constriction of the annulus. For positively limiting the downward movement of the annulus, I provide a stop in the form of tube 74 which has press fit in housing bore 13. The upper end 74' of the tube provides the packer stop. The bore 75 of this tube is of the same diameter as bores 12 and 23, and the tube is annularly spaced from both piston portion 42 and the lower end of actuator wedge-portion 54. Ports 76 open from bore 75 to chamber 77, which latter is annularly defined by the tube and the piston portion 42, while it is defined endwise by body wall 78 and the lower end of the packer.

When cap 16 is subsequently secured in place, its horizontal under-surface 79 provides a stop for limiting upward movement of the packer, the upper plates 63 of control elements 56 sliding over this surface as the packer is radially constricted or expanded. Tube end 74' and cap surface 79 thus form vertically spaced stops which prevent appreciable vertical movement of the packer with relation to the body member 11.

It will be seen that the radial constriction of the packer is accomplished by virtue of relative vertical movement between the packer and the actuator. While the illustrated embodiments of the invention show this relative movement as brought about by holding the packer against vertical movement with respect to the body member and then moving the actuator vertically with respect to the housing and packer, it will be understood the arrangement and operation may be reversed without departing from the spirit of the invention, and my broader claims are to be considered as including such reversal.

I have shown pipes 51 and 52 leading to valves 80 and 81, respectively, which valves have relief or exhaust lines 82 and 83, respectively, and pressure lines 84 and 85, respectively. Lines 84 and 85 are connected by pipe 86 to a source (not shown) of fluid under pressure which may be, for instance, a feed pump for supplying liquid under pressure, or may be compressed gas. It will be understood that this is merely a conventional showing. Ordinarily the control valves are interconnected and pressure regulating valves are introduced in the system for automatic control of the relative pressures in chambers 47 and 48. A particularly advantageous system is disclosed in my co-pending application entitled "Regulator Valve," Serial No. 744,353, filed April 28, 1947, now Patent No. 2,524,264 of October 3, 1950.

However, for the purpose of describing a typical operation of the control head, it will suffice to assume first that, in standby condition, valves 80 and 81 are adjusted to put chambers 47 and 48 in communication with the atmosphere, the control head then being in the condition of Fig. 3. The packer is now fully expanded, the diameters of the bores defined by plates 63, 64, the packer bore 59, and bores 12, 75 and 23 all being substantially equal so that maximum sized work may be accommodated throughout the vertical extent of the control head.

It will now be assumed that a "blow-out" occurs, or some other reason arises for closing the packer about drill stem 87 (Fig. 6). I will briefly describe a typical operation of the packer and then return to a more detailed discussion of the various phases of that operation.

The operator adjusts valve 81 to cause the flow of fluid under pressure into chamber 48, thus elevating the actuator 41 and causing constriction of the packer P about pipe 87 (Fig. 6). It will be noted that the packer is bodily radially constricted from end to end, as distinguished from a situation where one end or one portion of the packer is anchored against constrictive movement. This constriction causes the rubber to flow or extrude as a plastic, the mass of rubber assuming somewhat the shape illustrated in Fig. 6. The direction of extrusion is mainly radially inward, plates 63 and 64 of the control members 56 confining the rubber, extending vertically between those plates, against vertical extrusion. The only vertical extrusion allowed is that of the rubber in line with spaces 70, that of the rubber which is ultimately extruded radially inward beyond the inner ends of the plates, and that of the outer annulus between faces 66 and the defining wall of bore 53.

If the "hole pressure" be relatively small it may be that constriction of the packer to the extent shown in Fig. 6 will suffice, and the operator need merely then close valve 81 to trap the actuating fluid within chamber 48 and thus hold the packer in its new position. But let us assume that the "hole pressure" is great, and therefore it is necessary more tightly to pack off the drill stem. Additional fluid under pressure may be admitted to chamber 48, thus lifting actuator 39 to the position of Fig. 9 in a manner to radially constrict the packer to an extent which causes the rubber annulus to flow into the condition shown in that figure. It will be noted that in both Figs. 6 and 9, the rigid control elements 56 have traveled inwardly and have thus partially closed off the lower end of cap-bore 23 and the upper end of tube bore 75. The upper and lower plates thus serve not only to direct the flow of the rubber radially inward, instead of flowing any major portion of it endwise with respect to the rigid members, but also form a progressively advancing, rigid bridge which reduces the extent of unsupported rubber between the actuator and the drill stem. Of this, more will be said later, it sufficing here to note that the type of operation just described is only one of many that may be performed with the control head.

As soon as the packer has closed about the drill stem, the "hole pressure" becomes effective against the actuator. That is, when the head is in the condition of Fig. 6, the hole pressure in chamber 77 is effectively applied against the piston portion 42 and thus tends to raise actuator 39. In fact, if the hole pressure be great enough, it may be, and often is, effective to raise the piston higher than the position to which it had been raised by the setting pressure in chamber 48, in spite of the fact that the effective pressure area of piston 42 is less than that of piston portion 41. Thus, as the hole pressure increases to an extent which calls for tighter sealing about the drill stem it becomes increasingly effective to cause that tighter sealing.

If it be desired to rotate or move the drill stem vertically while still maintaining a seal, it may be necessary that the constrictive pressure on the packer be relieved somewhat. Under that circumstance, and assuming the hole pressure has taken over the burden of holding the packer constricted, valve 81 is opened to allow relief of pressure from chamber 48, and valve 80 is operated to admit fluid under pressure to chamber 47, thus counteracting a portion of the hole pressure and causing a lowering of the actuator 39 and a consequent radial expansion of the packer. The manipulation may be such that the packer is expanded just sufficiently that there is small leakage through it, thus insuring sufficient lubrication to prevent burning of the rubber as the drill stem is manipulated.

Fig. 6 illustrates a condition where the packer is expanded to an extent sufficient to allow the drill stem to be moved vertically and to carry or "strip" the collar 88 through the packer without damage to the latter. The rubber lip-portion 90 of annulus 55, which portion is in contact with the drill stem at this time is free to bend and flow sufficiently to allow this passage. Further, if the actuating fluid in chamber 48 be a compressible gas, or if a proper regulating valve be introduced in the supply line of non-compressible actuating liquid, the piston will be forced down by the reactive force of the annulus thereagainst as it is relatively expanded while the collar is passing through the packer, and then the expansion of the actuating gas or the automatic feed of actuating liquid by a regulating valve in feed line 52 will restore the piston and packer to the condition of Fig. 6 as soon as the coupling clears annulus 55.

In a control head wherein the full open bore of the packer is about 7" and all other parts of the device are proportionately sized, it is found that if the hole pressure is below 1200 pounds per square inch there will ordinarily be pressure carried in the lower chamber 48 in order to maintain a seal. If the hole pressure be above 1200 pounds, the pressure in chamber 48 must be relieved and pressure must be applied in the upper chamber 47 if rotating or "collar stripping" operations are to be performed. In general, the pressures in chambers 47 and 48 are regulated to give a proper differential (including consideration of the effective well pressure) to hold the seal on the pipe and yet permit rotative or longitudinal movement of the pipe without damage to the rubber. Of course, in emergencies where it is necessary to seal off against high pressures and there is no occasion for rotating or reciprocating the drill pipe, the liquid in the lower chamber may be trapped by closing valve 81 and thus positively prevent the lowering of the actuating member if there should be surges in the hole pressure, and thus prevent radial expansion or loosening of the packer.

It has also been found possible to utilize the head as a variable aperture or shut-off valve where no work extends through the bore of the packer. This condition is illustrated in Fig. 24 where the actuator 39 has been raised to a position entirely closing off the bore of annulus 55. As one instance, a head having the proportions mentioned just above was operated as a shut-off valve by applying 800 pounds per square inch pressure to chamber 48. With the annulus bore thus completely closed, 5500 pounds per square inch hole-pressure was applied to the underside of the packer and no leakage resulted. This tremendous well pressure was thus held against escape in spite of the fact that the annulus bore had been closed down completely from a beginning diameter of a little more than seven inches. Or, by constricting the annulus so its bore is of any predetermined diameter intermediate that of Figs. 6 and 24, the head may be used as a variable-orifice flow control valve.

I will now discuss some of the individual characteristics and performances of certain elements of the control head. It will be seen by reference to Figs. 20 and 21 that the effective setting pressure area of piston 41 may be represented by the area of an annulus whose outside diameter equals "$a$" and whose inside diameter equals "$b$." On the other hand, the effective area of the reaction pressure or resistance pressure of the packer P, may be represented by the area of an annulus having an outside diameter "$c$" and an inside diameter "$d$." Thus, the setting pressure area and the reaction pressure area are in the ratio of $a^2-b^2$ to $c^2-d^2$. Since $a^2-b^2$ is greater than $c^2-d^2$, advantage lies in favor of the pressure applying side of the system. If actuator 39 now be raised as in Figs. 2, 3 or 21, the pressure applying area remains as before, while $d$ and $c$ are each reduced by an increment $x$. So the ratio between the setting pressure area and the reaction pressure area becomes $$\frac{a^2-b^2}{c^2-d^2-2x(c-d)}$$

This ratio, of course, represents an increased advantage in favor of the pressure applying side of the system, so, as the pressures to be overcome increase, so also does the advantage ratio increase, with obvious benefit. As an example, in a control head having the proportions mentioned above, the ratio of setting pressure area to reaction pressure area (or advantage ratio) is 1.704 to 1 at the beginning of the piston stroke and rises to 2.142 to 1 after but little piston movement. As a further illustration, in a situation where it would have required 2340 pounds per square inch in order to close the annulus bore down to a given diameter were the ratio of setting pressure area to reaction pressure area to have been 1 to 1, it required only a little over 1000 pounds per square inch of setting pressure to effect the same closure—by reason of the described advantage ratio. Generally, it may be stated that the advantage ratio rises in direct proportion to upward piston travel.

Similarly, a beginning ratio advantage (though of lower order) exists between the setting pressure area of piston 42 and the reaction pressure area. This ratio advantage also increases during up movement of the piston.

Figs. 22 and 23 illustrate a condition which is taken into account in the design of the packer. These views illustrate the packer as though it had a cylindrical bore when in fully expanded condition (Fig. 3). In any tubular packer, the extent of the reduction in inside diameter per unit of reduction in outside diameter, depends upon the ratio of the "beginning" outside and inside diameters. In the illustrated case, the ratio of the "beginning" diameters (Fig. 22) at the top of the packer is $$\frac{e}{f}$$

and, at the bottom of the packer is $$\frac{g}{f}$$

Since $$\frac{e}{f}$$

is greater than $$\frac{g}{f}$$

the reduction of the inside diameter at the top of the rubber is greater than the reduction of the inside diameter at the bottom of the rubber per unit $x$ of over-all reduction of the outside diameter of the packer. It is obvious that in the immediately above expression the words "per unit of piston stroke," may be substituted for the word "per unit of over-all reduction of the outside diameter of the packer." Thus, as the packer is radially constricted by upward movement of the actuator 39, the inside bore of the packer gradually takes the conical shape shown in Fig. 23, the inside diameter $k$, at the upper end of the packer being smaller than the inside diameter $m$ at the bottom of the packer.

While the described condition does not render the packer unworkable, and therefore a packer of this shape is to be considered as included within the scope of my broader claims, it is preferable in some situations that the packer bore be more nearly cylindrical as it approaches its constricted condition. It is for this reason that the upper portion 60 of the packer bore is flared as illustrated in Fig. 3, wherein the medial cylindrical portion 59 of the bore is of substantially the same diameter as the bores defined by the inner ends of the plates 63 and 64; while the flaring portions 60 and 61 of the packer bore give the effect of undercuts with relation to the inner ends of the plates. Because of this undercutting effect at the top of the packer, the upper plates initially lead the rubber at the upper end of the packer during construction thereof and, because of the effect illustrated in Fig. 23, the upper bore portion 60 gradually assumes a more nearly cylindrical shape. The upper and lower flaring of the packer bore also removes excess rubber stock and aids in causing the rubber to flow into the shape of Fig. 6 upon actuation of the control head to a predetermined extent, the central "lip" effect illustrated at 90, with the upper and lower packer surfaces dished as at 91 and 92, facilitating the stripping of collar 88 through the packer.

The amount of rubber displaced radially inward in any given horizontal plane of the rubber for a given unit of piston travel and with a given degree of packer-taper, depends on the ratio of the outside and inside diameters of the annulus, at that plane, at the start of the piston stroke through that increment. Thus, it is possible to fashion the packer with any chosen relative inside and outside diameters and with chosen degrees of taper, to give the different effects which may be desirable for performing different types of work. For instance, where low well pressures are involved and work of a given diameter is to be engaged, the outside diameter of the rubber may be increased, with a corresponding increase in the average diameter of the actuator bore 53, in which case each increment of piston travel extrudes the rubber radially inward to a greater extent than in the illustrated case, there then being a greater inward radial extent of rubber remaining unsupported between plates 63 and 64. This effect is not harmful in view of the relatively low well pressure involved in the problem selected for illustration, and allows the more ready response of the rubber to stripping and rotating operations.

On the other and, by reducing the average diameter of bore 53 and correspondingly reducing the outside diameter of the packer, while the "beginning" diameter of the packer bore remains as before, there is less inward displacement of the rubber per increment of piston movement and the rubber will "lead" the rigid plates by a lesser extent—all to the end that the packer is better adapted to withstand high well pressures.

As stated, the inward displacement of the rubber in a given horizontal plane, per unit of actuator movement, is a constant which depends wholely upon the "beginning" ratio of the inside and outside diameters of the rubber at that plane, and this is true irrespective of the number of ribs 65 or the number of spaces 93 therebetween. But the ribs, in addition to their function as a tie between plates 63 and 64, do play a part in directing the flow of the rubber. Plates 63 and 64, particularly when they project inwardly to an extent which causes them to define bores of lesser diameters than bores 23 and 75, serve to control endwise flow of the rubber, while ribs 65 define spaces 93 which may be considered as directional passageways controlling the direction of radial flow from the outer portion of the rubber annulus to the inner portion thereof. The aggregate spacing of the ribs is sufficient to accommodate ample rubber for extrusion and to permit relatively free inward flow of rubber from all portions of the outer annular portions thereof. The passageways 93 are also symmetrically spaced about the packer and are sufficient in number to feed rubber uniformly and evenly to the inner portion of the annulus, thus avoiding wrinkling effects which would prevail otherwise.

The ribs also have an important function in connection with the radial movement of plates 63 and 64. The bonding of the rubber to the ribs and plates tends to carry the control members 56 inwardly as the rubber is radially constricted, though such bonding is not essential in all cases. Also tending to move the members 56 radially inward with the rubber and thus to preserve the spacing of the plate ends 66 from the wall of actuator bore 53 as well as to provide partial end support for the packing rubber as its bore becomes less than the diameter of bore 23, is the rubber 72 extending between the wall of bore 53 and the rearward side 67 of each rib, or more generally, between that bore wall and the widest portion of the rib. It is that mass of rubber which has to be displaced to the greatest extent during the constriction of the packer and it is found that it has the effect of actually moving the members 56 radially inward with respect to the packer itself as the actuator is raised, thus actually increasing the thickness of the mass of rubber 72 extending radially between the wall of bore 53 and rib faces 67. This condition is illustrated diagrammatically in Fig. 18 which illustrates the relative positions of the rubber and a control member 56 at a single horizontal plane during given piston stroke, though the diagram is drawn as though the packer were being depressed through the actuator.

Thus, the dimension "r" represents the common radius of the annulus bore 59 and the bore defined by plates 63, 64 when the packer is fully expanded, and dimension "s" represents the rubber between the wall of actuator bore 53 and the rearward faces 67 of the plates. As the piston is actuated to constrict the packer, the member 56 moves radially inward with the packer, though the radius of the rubber annulus bore decreases much more rapidly than does that of the bore defined by the control members. However, the rubber 72 between the bore wall of the piston and the rib faces 67, has the effect, as the piston bore diminishes, of pushing the control member inwardly with respect to the outer periphery of the rubber annulus. Thus, at the end of the piston stroke, the dimension "t" is greater than was dimension "s" and plates 63 and 64 have been radially advanced in a manner to reduce the unsupported extent 94 of the rubber beyond that which would have existed if the ribs had traveled inward at exactly the same rate as the outer face of the packer.

By shaping the ribs so the mass of effective control-member-moving rubber is changed, the extent of movement of members 56 with respect to the rubber annulus, may be varied. For instance, in Figs. 14, 15, 16, and 17 rigid members 56a are of the same proportion as members 56, but longitudinal flanges 95 are extended along ribs 65. Flanges 95 increase the effective width of the ribs, therefore confining between them and bore wall 53 a greater mass of rubber. Consequently, for given piston travel, members 56a will advance with respect to bore wall 57 and the packer rubber to a greater extent than do the members 56 which have no rib flanges. Flanges 95 may be considered as reducing the effective width of passageways or spacings 93' over that of passageways 90, or these flanges may be considered as establishing restricted gates 96 controlling the flow of rubber originally lying behind or radially outward of the ribs 65a. Thus, either or both by increasing the horizontal extent of flanges 95 or by shifting these flanges toward or away from the leading edge of the ribs, the extent of radial movement of the members 56a with respect to the packing rubber may be varied at will.

The control members 56 perform another important function which is particularly advantageous when the packer is used as described in connection with Fig. 24, though its usefulness is not limited to that situation. When well pressure is applied to the lower end of the packer, there is a tendency to put the packer under damaging shear stress. However, since the members 56 anchor down the lower end of the packer, the upwardly directed well pressure throws the packer into tension and thus relieves the shear stress.

Fig. 19 is a view similar to Fig. 18 except it shows the response when control members of the type shown in Fig. 14 are substituted for those of the type shown in Fig. 13. It will here be seen that though the relative starting positions of the rubber and control member are the same as in Fig. 18, the member 56a has advanced considerably more with respect to bore wall 53 at the end of the stroke than was the case of member 56. In Fig. 19 it is shown that $t'$ is greater than $t$ and therefore the amount of unsupported rubber 94' extending radially inward from member 56a is diminished over that shown in Fig. 18, and the response is therefore better in case high well pressures are to be encountered.

After the packer has been closed about the pipe by the application of pressure to piston 41, the hole pressure tends, of course, to raise the packer and thus frictionally to engage plates 63 with cap face or stop 73. Under certain conditions this pressural engagement is forceful enough to prevent further inward radial movement of members 56, in which case additional constrictive forces applied to the packer tend to reduce the radial extent of dimension $t$ or $t'$, but this dimension will preferably have such initial or built-up value that it will never normally be reduced to zero under such conditions.

Assuming the packer is in the condition of Figs. 6 or 9, complete relief of pressure in chamber 48 will, in the absence of effective hole pressure, allow actuator 39 to drop. Or pressure may be admitted to chamber 47 to drive the piston down against the well pressure. Thereupon, the inherent resiliency of annulus 55 restores the packer to the fully expanded condition of Fig. 3. This is true even after the packer has been repeatedly constricted to the extreme condition of Fig. 24.

For various reasons, it is advantageous for the operator to be able to determine the relative position of actuator 39, and hence the relative condition of packer P, at all times. For this purpose I provide the indicator shown in detail in Figs. 7 and 8. A bar 97 is arranged in chamber 48, directly beneath piston portion 41. Depending from this bar are guide rods 98 which project into wells 99, the latter extending downwardly through body member 11 but being closed off at their lower ends by plugs 99'. Springs 100 encircle rods 98 within the well and exert a constant force tending to hold bar 97 in engagement with the underside of piston portion 41 throughout movements thereof. An indicating rod 101 is welded to bar 97 at 102 and extends through bore 103 and packing 104 to the exterior of the body member. The exposed portion of the indicator rod is protected by ribs 105 which are integral with the body member 11. It is obvious that the indicator rod 101 will follow the piston in all its movements and, by relating the end 106 of the rod to, for instance, the bottom of ribs 105, the operator may determine the relative position of the actuator 39 and the relative condition of packer P.

In describing the following variational embodiments of the invention, I will use the same reference numerals as applied to equivalent parts of the embodiment just described, plus, in certain instances, letter subscripts. What has been said before about given parts, their function, and operation, is to be considered as applying likewise to equivalent parts of the variational embodiments.

In Figs. 25 to 28 I have shown a form of control head wherein the packer Pa is cylindrical and has a cylindrical bore 58a. The rigid control members 56a have similar upper and lower plates 63a and 64a which are connected by a rectangular rib 65a. In place of utilizing a piston for radially constricting the packer Pa, I provide a body of plastic or resilient material 107 such as rubber having a durometer hardness of about 45 to 50, which material is contained within body chamber 108 and is in direct engagement with the outer peripheral face of packer Pa. A fluid pressure line 109 opens to the upper end of the chamber 108 and, when it is desired to constrict the packer, fluid pressure admitted to this chamber depresses and extrudes rubber 107 and forces radial constriction of the packer Pa, as illustrated in Fig. 28. The rigid members 56a, with their plates 63a and 64a, move inwardly to control and confine the end-flow of the rubber, as clearly illustrated in this figure. Upon relief of the pressure in chamber 108, the resiliency of the rubber in packer Pa (which rubber may have, for instance, the same durometer hardness as the rubber of packer P) causes the packer to expand radially and return to the position of Fig. 25, the body of actuating rubber 107 being forced back to the position of that figure.

Figs. 30 through 33 illustrate a variational form of control head wherein the packer Pb is the same general shape as packer Pa, but the rigid members 56b have their ribs 65b arranged so their rearward vertical edges 67b are flush with the rearward edges 66b of plates 63b and 64b, said edges 66b and 67b being flush with the outer peripheral face of packer Pb. In this case, if desired, the packer annulus 55b may be molded with slots 110 opening to the outer peripheral face thereof, the rigid members being subsequently assembled with the annulus by thrusting ribs 65b into the slots 110. This provision renders it easier to extract the rigid members from a worn out packer for placement in a new rubber annulus.

The packer Pb is held against vertical movement between body member face 111 and the under side of cup member 112, the latter, in turn, being held against upward movement by the neck 113' of cap 16b.

An annular chamber 114 is annularly defined by body member 11b, packer Pb, and cup 112. In this chamber is provided a body of actuating material 107b, similar to material 107 in Fig. 25, but the pressure for extruding the material 107b and thus causing constriction of packer Pb is applied through a piston 113 which is adapted to play through the upper end of chamber 114. The piston 113 may be depressed either by the application of manual force or the application of fluid pressure. For instance, thrust rods 115 are secured to piston 113 and extend upwardly through packing 116 in cap 16b to the exterior of the head. Thrust ring 117 has threaded engagement 118 with the upstanding flange 119 of cap 16b. By threading ring 117 downwardly over flange 119, piston-depressing force is applied uniformly to rods 115.

As an alternate method of operation actuating fluid pressure may be admitted through port 120 to chamber 121 above piston 113 to cause piston-depression and consequent packer constriction.

Figs. 33 and 34 illustrate the condition of the control head when the packer is constricted, in this case the piston having been depressed by actuation of ring 117. Upon allowing piston 113 to rise, the resiliency of packer Pb restores all parts to the condition of Figs. 30 and 31.

Figs. 35 through 44 illustrate an embodiment of the invention wherein the generalities are similar to that of Fig. 25, and therefore need no individual description, but the packer and rigid flow-control members are different in certain respects.

Here, the packer Pc has an outer cylindrical peripheral face F and is provided with annular end flanges 122 and 123. The bore 58c of the packer has a medial cylindrical portion 124, and end portions 125 of increased diameter, the conical bore portions 126 extending between portion 124 and portions 125.

The rigid, rubber-flow-control members 56c are here in the form of upper and lower plates, only, that is, no inter-connecting ribs are employed between those plates. The plates of the upper series 127 are similar to those of the lower series 128, and therefore a description of a single series will suffice. However, it will be noted that an annular groove 129 is provided in the bottom face 130 of a cap flange 131, and a similar groove 132 is provided in the upper face of the bottom wall 133 of body member 11c. In these annular grooves are positioned similar guide rings 134 (Figs. 35, 43 and 44) the purpose of which will hereinafter appear.

The rigid plates 63c are all identical in construction, comprising a sectorial body portion 135 and a tab portion 136, the exposed face of the tab portion being in a different plane than the exposed face of the body portion. The body portion 135 has inner and outer peripheral flanges 137 and 138, respectively, while tab portion 136 has inner and outer flanges 139 and 140, respectively. The tab and body portion of a given plate, together with the tab and body flanges, are so relatively proportioned that the tab of a given plate is receivable beneath or above (depending upon whether we are considering the upper or lower series of plates) by the body member of the adjacent plate in telescopic or overlapping relation, in the manner clearly shown in Figs. 36, 39.

The tab flanges 139 and 140 fit over the packer flanges 122 and 123 and thus tie the individual plates to the packer so they move radially therewith.

When fluid pressure is applied to chamber 108, actuating material 107c, similar to that described in connection with Fig. 25, causes radial constriction of the packer, as illustrated in Fig. 37, the plate elements moving, as a series, radially and circumferentially to the positions of Figs. 37, 38 and 40, somewhat in the manner of a camera iris. Due to the overlap of the body and tab portions of adjacent plates, the upper and lower ends of the packer are wholly confined, as distinguished from the situation in the other forms of packers where space exists between adjacent plate members.

Upon relief of the pressure in chamber 108 the inherent resiliency of packer Pc causes it to return to the position of Fig. 35.

In order that there may be no danger of the plates 63c shifting circumferentially in a manner to cause uneven spacing therebetween, each rigid member 63c is provided with a pin 141 adapted to ride in one of the radial slots 142 of the associated ring 134, said slots 142 being spaced from one another at equal angles. It is not necessary that the rings be anchored against circumferential shift or that they be held in any particular relation one with the other, since their sole function is to maintain uniform angular spacing of the plates of a given series. However, in some instances it may be desirable to utilize the end walls of the slots for limiting the extent of radial movement of the plates in either direction.

While I have illustrated and described preferred embodiments of my invention, it will be realized various changes in design, structure and arrangement may be made without departing from the spirit and scope of my broader claims.

I claim:

1. In a device of the character described, a housing having a vertical bore therethrough, a packer comprising a massive annulus of resilient material and positioned within the housing with its bore alined with the housing bore, a pair of series of circularly arranged and angularly spaced rigid plates, the series being located, one each, at the opposite ends of and connected to the annulus, vertically spaced shoulders provided in the housing and receiving the packer between them to limit vertical movement of the packer with respect to the housing, said plates being in face-to-face opposition to the shoulders, a body of flowable material confined in the housing about the outer peripheral face of the packer, and means for applying pressure to the material and thereby causing it to radially compress and contract the packer.

2. A closure element comprising a massive annulus of resilient material whose outer annular portion, from end to end, is adapted to be radially contracted from a condition of relative radial expansion, thereby to radially compress the inner annular portion, a pair of series of circularly arranged, rigid plates, the series being located, one each, at the opposite ends of the annulus, the plates of a given series being individually connected to said outer annular portion for bodily movement therewith, at least two plates of each series being relatively movably connected to one another through their connection with the annulus, and the plates in each of said series being individually movable radially inward while said outer portion is being radially contracted through predetermined extent, rigid tie members extending through the annulus and rigidly connecting, one each, a plate of one series with a plate of the other series, and longitudinally extending, spaced-apart ribs on the tie members of adjacent plates.

3. A closure element comprising a massive annulus of resilient material whose outer annular portion, from end to end, is adapted to be radially contracted from a condition of relative radial expansion, thereby to radially compress the inner annular portion, said annulus having a flaring mouth at one end, at least, of its bore, a pair of series of circularly arranged, rigid plates, the series being located, one each, at the opposite ends of the annulus, the plates of a given series being individually connected to said outer annular portion for bodily movement therewith and extending radially inward beyond the flaring mouth of the bore when the annulus is radially expanded, at least two plates of each series being relatively movably connected to one another through their connection with the annulus, and the plates in each of said series being individually movable radially inward while said outer portion is being radially contracted through predetermined extent.

4. In a device of the character described, a housing having a work-taking bore, a packer in the housing and comprising an annulus of resilient material, said annulus being free, from end to end, from effective radial constrictive restraint by the housing and being bodily radially contractible throughout its axial extent, an annular packer-actuating medium within the housing and externally in sealing relation therewith, the bore wall of said actuating medium presenting a circumferentially-continuous wall to the outer peripheral face of the packer and in sealing engagement therewith, said packer actuating medium being operable to radially contract the packer, and means for operating the actuating medium.

5. In a device of the character described, a housing having a work-taking bore, a packer in the housing and comprising an annulus of resilient material, said annulus being radially contractible throughout its axial extent, a circular series of angularly spaced rigid ribs embedded within and extending axially of said annulus, axially spaced, transverse flanges on said ribs and engaged with said resilient material when said annulus is radially contracted, said ribs being resiliently connected to one another by the annulus, a packer-actuating medium within the housing and externally in sealing relation therewith, said actuating medium having a bore presenting a circumferentially-closed wall to the outer circumferential face of the packer and in sealing engagement therewith, said medium being operable to radially contract the packer, and means for operating the actuating medium.

6. In a device of the character described, a housing having a work-taking bore, a packer in the housing and comprising an annulus of resilient material, a circular series of angularly spaced rigid ribs embedded within and extending axially of said annulus, axially spaced, transverse flanges on said ribs and engaged with said resilient material when said annulus is radially contracted, said ribs being resiliently connected to one another by the annulus, a packer-actuating medium within the housing and externally in sealing relation therewith, said actuating medium having a bore presenting a circumferentially-closed wall to the outer circumferential face of the packer and in sealing engagement therewith, said medium being operable to radially contract the packer, and means for operating the actuating medium.

7. In a device of the character described, a housing having an axial bore, a packer-actuator within the housing and having an axial bore substantially coaxial with the housing bore, the bore wall of the actuator being circumferentially continuous, said actuator being radially contractible and movable with respect to the housing in a manner to vary the effective diameter of the actuator bore and being externally in sealing relation with the housing throughout its operative movement, a packer comprising a circumferentially-continuous sleeve of resilient material within the actuator-bore and adapted to be in external peripheral sealing engagement with the wall of the actuator-bore, said sleeve being bodily radially contractible throughout its axial extent, and means for so moving said actuator and thereby applying radially inwardly directed pressure to the outer peripheral face of the sleeve.

8. In a device of the character described, a housing having an axial bore, a packer-actuator within the housing and having an axial bore substantially coaxial with the housing bore, the bore wall of the actuator being circumferentially continuous, said actuator being radially contractible and movable with respect to the housing in a manner to vary the effective diameter of the actuator bore and being externally in sealing relation with the housing throughout its operative movement, a packer comprising a circumferentially-continuous sleeve of resilient material within the actuator-bore and adapted to be in external peripheral sealing engagement with the wall of the actuating-bore, said sleeve being bodily radially contractible throughout its axial extent, vertically spaced shoulders provided in the housing and taking the packer between them and limiting axial movement of the packer with respect to the housing, and means for so moving said actuator and thereby applying radially inwardly directed pressure to the outer peripheral face of the sleeve.

9. In a device of the character described, a housing having an axial bore, a packer-actuator within the housing and having an axial bore substantially coaxial with the housing bore, the bore-wall of the actuator being circumferentially continuous, said actuator being radially contractible and movable with respect to the housing in a manner to vary the effective diameter of the actuator bore and being externally in sealing relation with the housing throughout its operative movement, a packer comprising a circumferentially-continuous sleeve of resilient material within the actuator-bore and adapted to be in external peripheral sealing engagement with the wall of the actuator-bore, said sleeve being bodily radially contractible throughout its axial extent, a circular series of angularly spaced, rigid inserts embedded in said sleeve and extending axially thereof, and means for so moving said actuator and thereby applying radially inwardly directed pressure to the outer peripheral face of the sleeve.

10. A closure element for a device of the character described, comprising an annulus of resilient material, a radially contractible and expansible armature embedded within and supported resiliently and solely by said annulus, said armature comprising a circular series of angularly spaced, rigid inserts extending axially of the annulus from end to end thereof, said inserts being capable of individual radial movement as controlled by the resilient material of the annulus.

11. A closure element as in claim 10, in which said inserts comprise ribs extending axially of the annulus, and transversely extending rigid, integral flanges on said ribs, the flanges of adjacent ribs being angularly spaced apart when the annulus is radially expanded.

12. A closure element as in claim 11, in which said flanges are at opposite ends of the annulus.

13. A closure element as in claim 11, in which said flanges are also spaced angularly apart when the annulus is radially contracted.

14. A device as in claim 4, including also a radially contractible and expansible armature embedded within and supported resiliently by said annulus, said armature comprising a circular series of angularly spaced, rigid inserts extending substantially the full axial extent of said annulus, said inserts being capable of individual radial movement as controlled by the resilient material of the annulus.

15. A device as in claim 14, in which said inserts comprise ribs extending axially of the annulus, and transversely extending rigid, integral flanges on said ribs, the flanges of adjacent ribs being angularly spaced apart when the annulus is radially expanded.

16. A device as in claim 4, in which said medium comprises a piston in the housing and engaged with the packer and actuatable to apply radially inwardly directed pressure to the outer peripheral face of the packer.

17. A device as in claim 4, including also vertically spaced shoulders provided in the housing and adapted to take the packer between them to limit vertical movement of the packer with respect to the housing.

18. A device as in claim 4, including also a pair of series of circularly arranged and angularly spaced rigid plates, the series being located, one each, at the opposite ends of the annulus, a plurality of the plates in each series being resiliently connected to one another through the annulus.

19. A device as in claim 18 including also vertically spaced shoulders provided in the housing and adapted to take the packer between them to limit vertical movement of the packer with respect to the housing, said plate-series being, one each, in face-to-face opposition to said shoulders.

20. A device as in claim 18, including also, rigid tie members extending through the annulus and spaced radially from at least one peripheral face thereof, said tie members rigidly connecting, one each, a plate of one series with a plate of the other series.

21. A device as in claim 18, including also, rigid tie members extending through the annulus and spaced radially from both peripheral faces thereof, said tie members rigidly connecting, one each, a plate of one series with a plate of the other series.

22. A device as in claim 14, in which said medium comprises a piston in the housing and engaged with the packer, said rigid inserts being radially spaced from said piston throughout radial expansion and contraction of the annulus.

GRANVILLE S. KNOX.

REFERENCES CITED

The following references are of record in the file of this patent:

UNITED STATES PATENTS

| Number | Name | Date |
|---|---|---|
| 1,839,394 | Inge | Jan. 5, 1932 |
| 1,977,504 | Brown | Oct. 16, 1934 |
| 2,035,925 | Seamark | Mar. 31, 1936 |
| 2,060,252 | Shaffer | Nov. 10, 1936 |
| 2,148,844 | Stone | Feb. 28, 1939 |
| 2,287,205 | Stone | June 23, 1942 |